Figure 1:
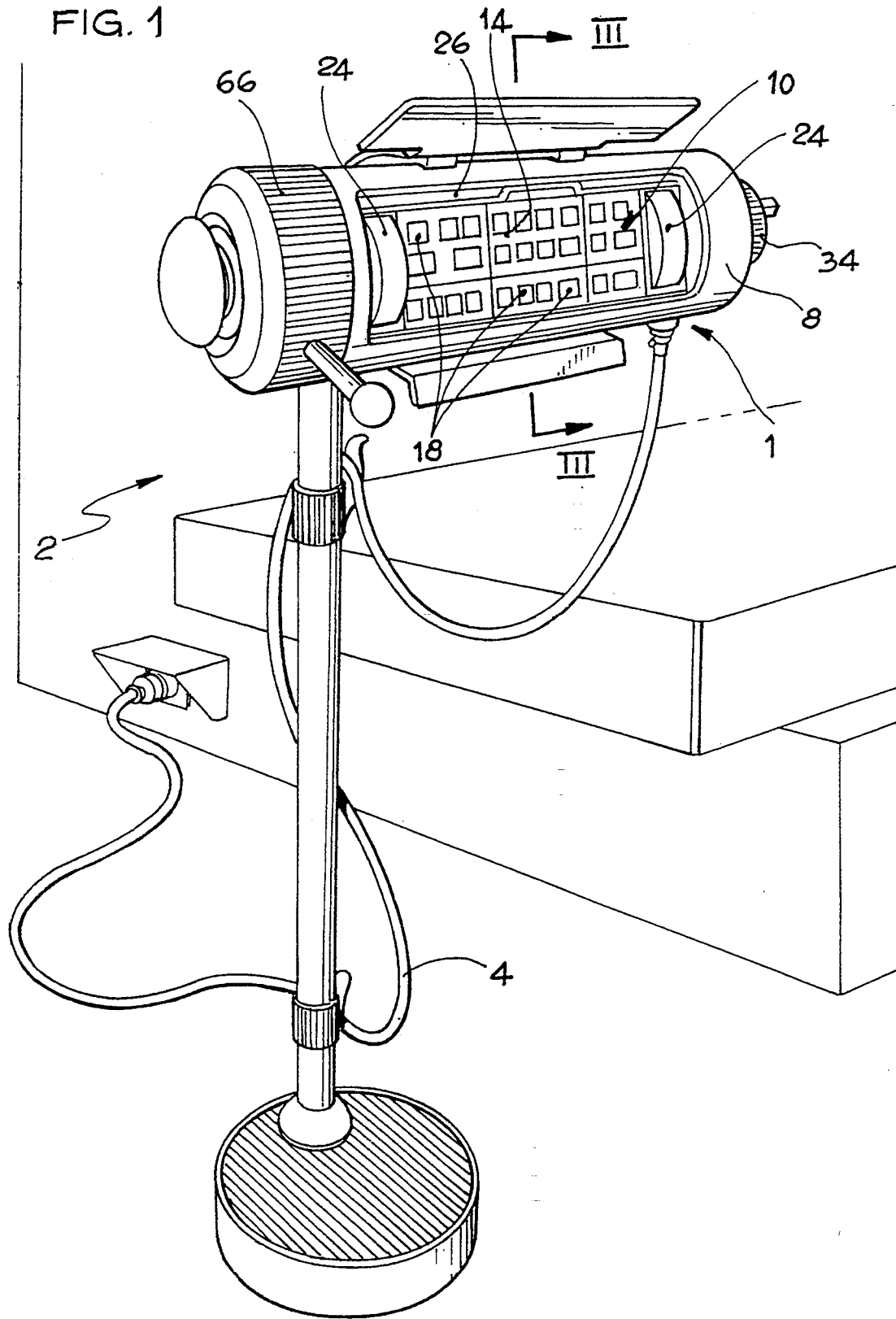

United States Patent [19]

Savazzi

[11] Patent Number: 5,376,934

[45] Date of Patent: Dec. 27, 1994

[54] KEYBOARD FOR THE REMOTE CONTROL OF MACHINE TOOLS AND THE LIKE

[75] Inventor: Ezio Savazzi, Cusano Milanino, Italy

[73] Assignee: Fidia S.p.A, San Mauro Torinese, Italy

[21] Appl. No.: 136,887

[22] Filed: Oct. 18, 1993

[30] Foreign Application Priority Data

Oct. 16, 1992 [IT] Italy ............................ TO92U000251

[51] Int. Cl.$^5$ ............................................. H03K 17/94
[52] U.S. Cl. ........................................ 341/22; 361/680;
361/686; 364/708.1
[58] Field of Search .................... 341/22, 23; 361/686,
361/680, 683, 679, 600; 400/485, 486; 364/189,
709.12, 708.1; 345/168; 200/5 A

[56] References Cited

U.S. PATENT DOCUMENTS

| | | | |
|---|---|---|---|
| 5,050,042 | 9/1991 | Richmond et al. | 361/679 |
| 5,103,376 | 4/1992 | Blonder | 361/680 |
| 5,181,024 | 1/1993 | Tsunoda et al. | 341/23 |
| 5,268,817 | 12/1993 | Miyagawa et al. | 361/679 |

*Primary Examiner*—Edward L. Coles, Sr.
*Assistant Examiner*—Fan Lee
*Attorney, Agent, or Firm*—Sughrue, Mion, Zinn, Macpeak & Seas

[57] ABSTRACT

The keyboard comprises a plurality of keys and/or manual controls connected to one or more boards which can generate coded electrical signals indicative of the commands put into effect by the operation of the keys and/or the manual controls. The keys and/or controls are divided into at least two sets disposed on at least two faces of a body which can rotate in a tubular casing having a display window. The faces can be positioned in the display window in turn as a result of the rotation of the rotary body.

11 Claims, 7 Drawing Sheets

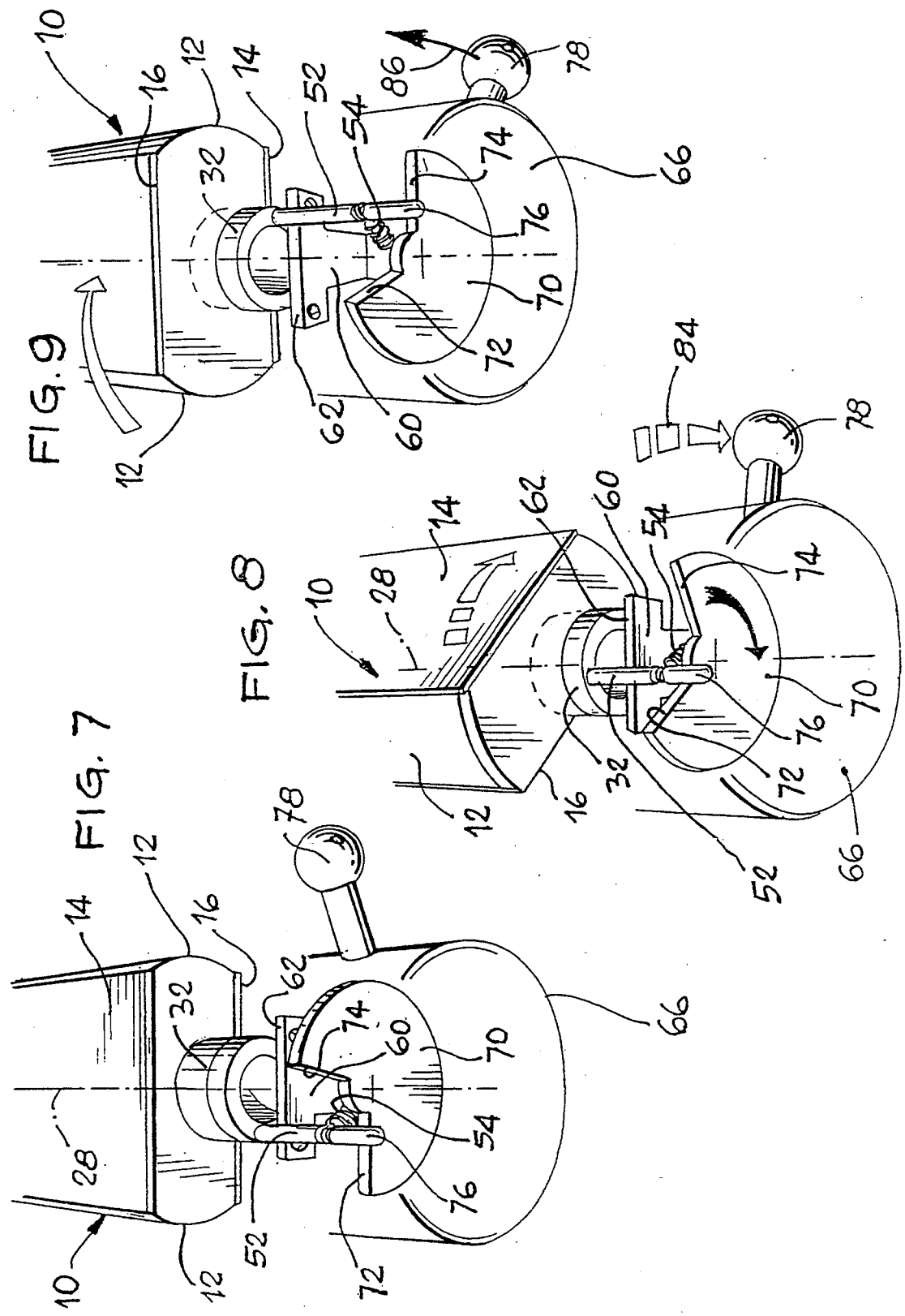

KEYBOARD FOR THE REMOTE CONTROL OF MACHINE TOOLS AND THE LIKE

DESCRIPTION

The present invention relates to a keyboard for the remote control of machine tools and the like, comprising a plurality of keys and/or controls connected to one or more boards which can generate coded electrical signals indicative of the commands put into effect by the operation of the keys and/or the controls.

In conventional keyboards, all the keys or controls are disposed on a single surface and consequently the item is not easy to grip, particularly if there is a large number of keys or controls.

The object of the present invention is to provide a keyboard which has a large number of keys or controls but which is compact and easy to grip.

According to the invention, this object is achieved by virtue of the fact that the keys and/or controls are divided into at least two sets disposed on at least two faces of a body which can rotate within a tubular casing having a display window, the faces being positionable in the display window in turn as a result of the rotation of the rotary body.

Figure 2:
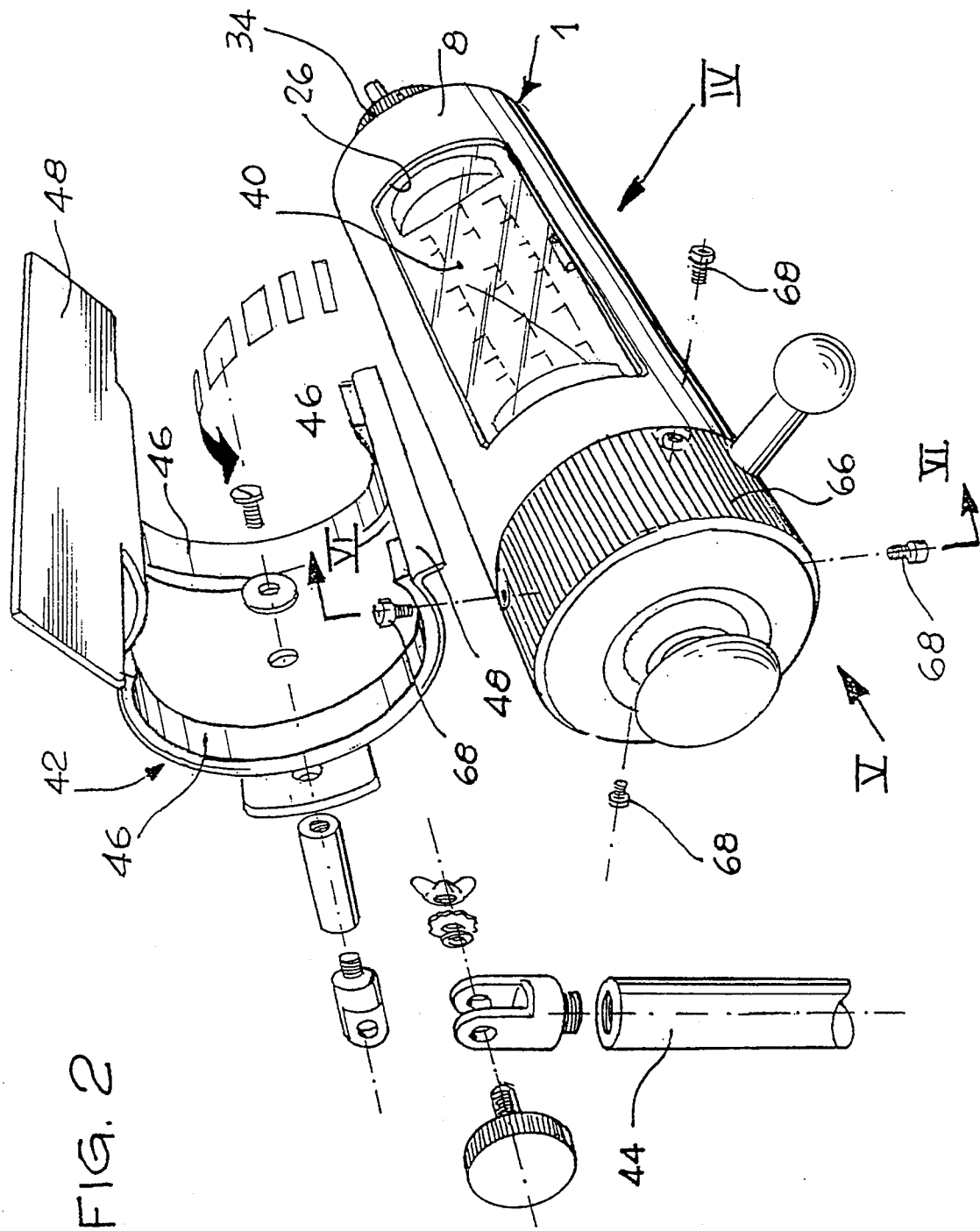
Figure 3:
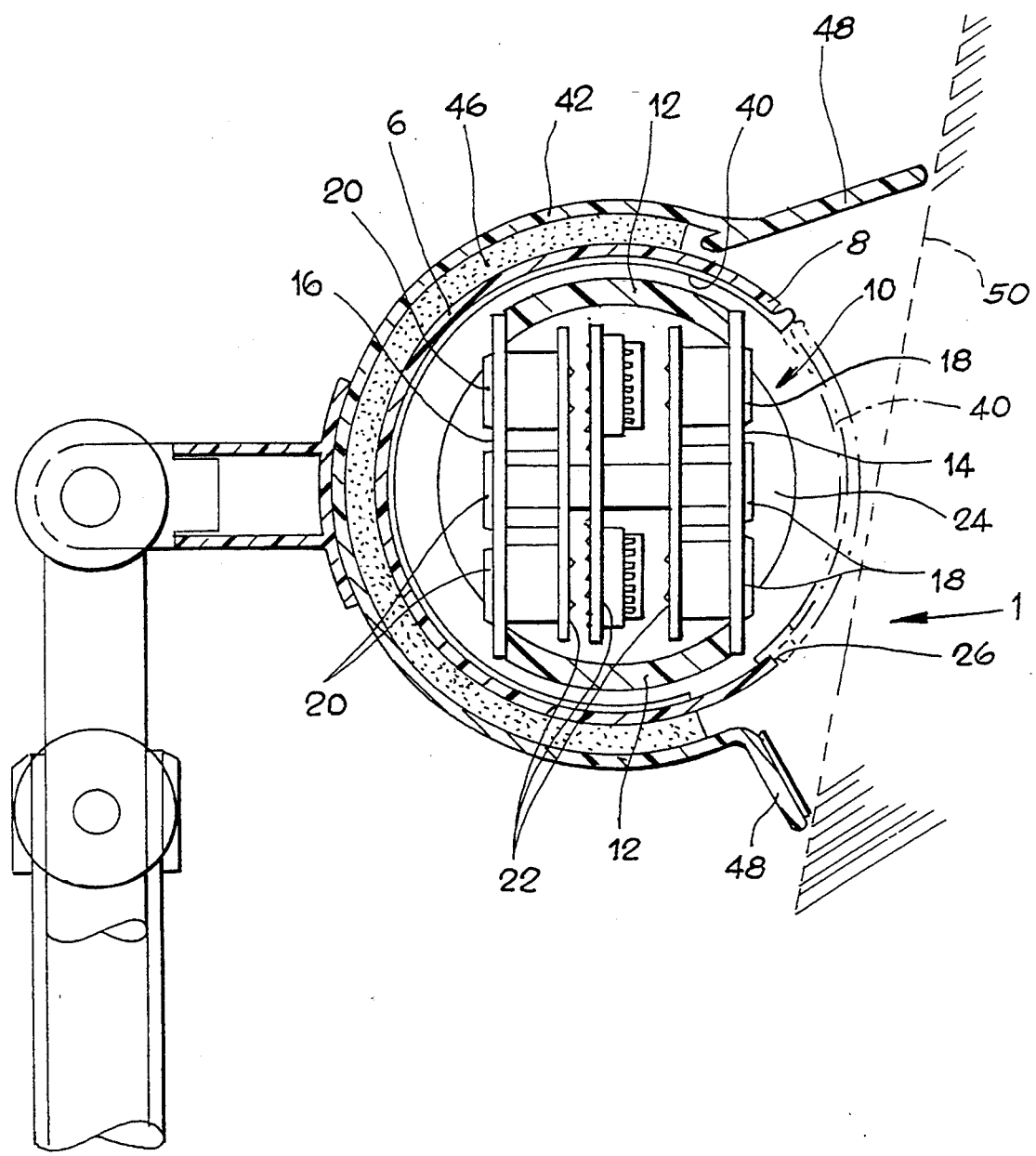
Figure 4:
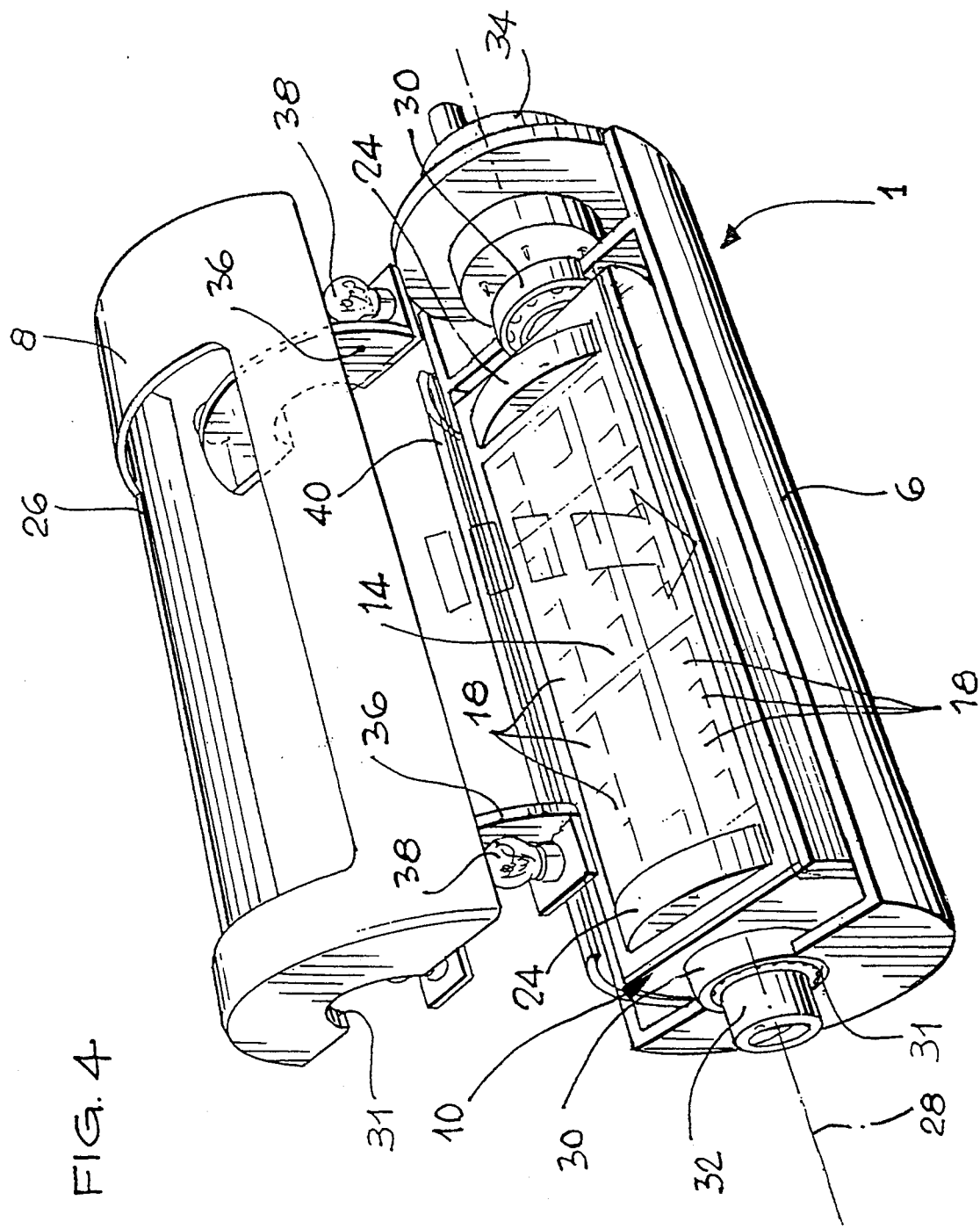
Figure 5:
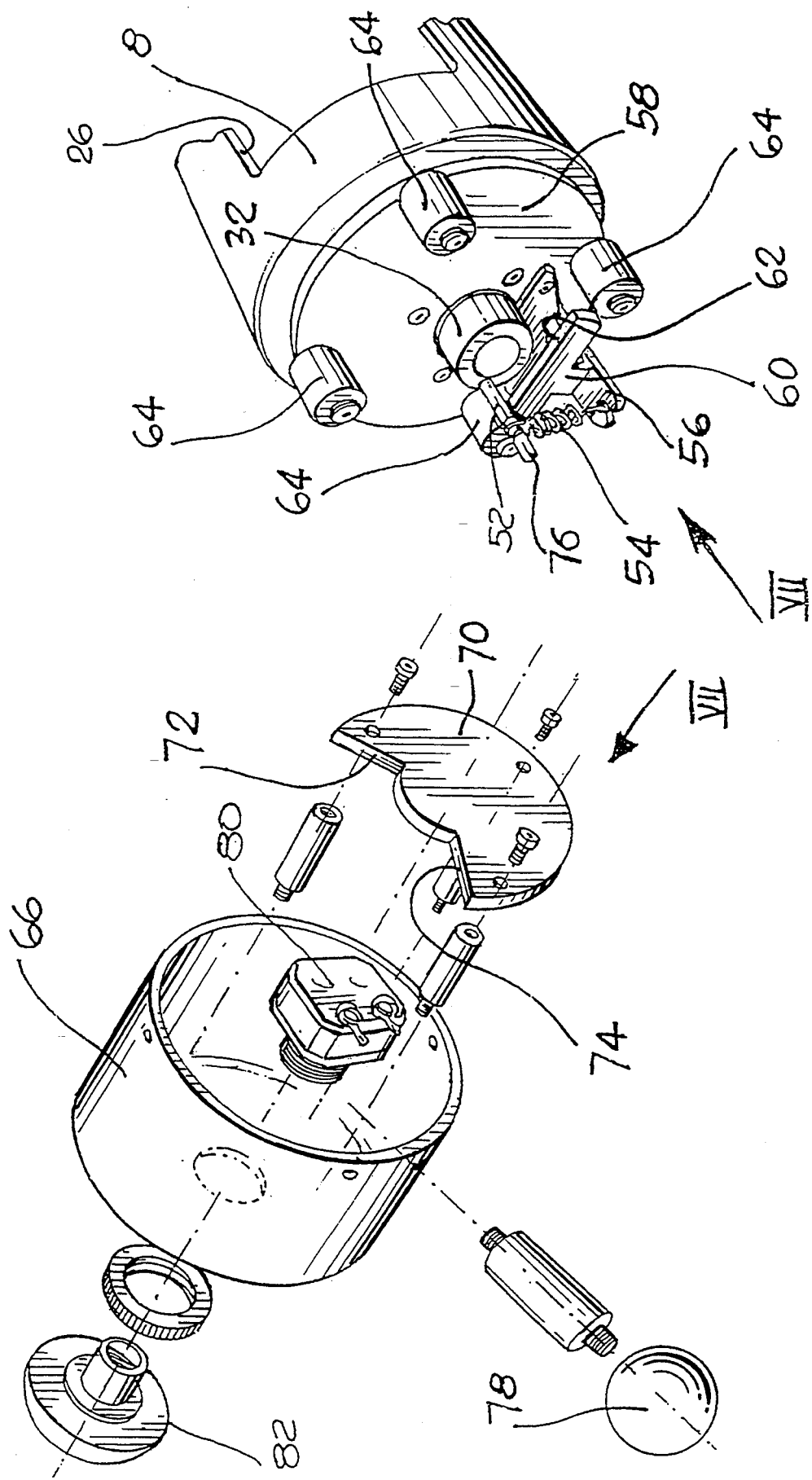
Figure 6:
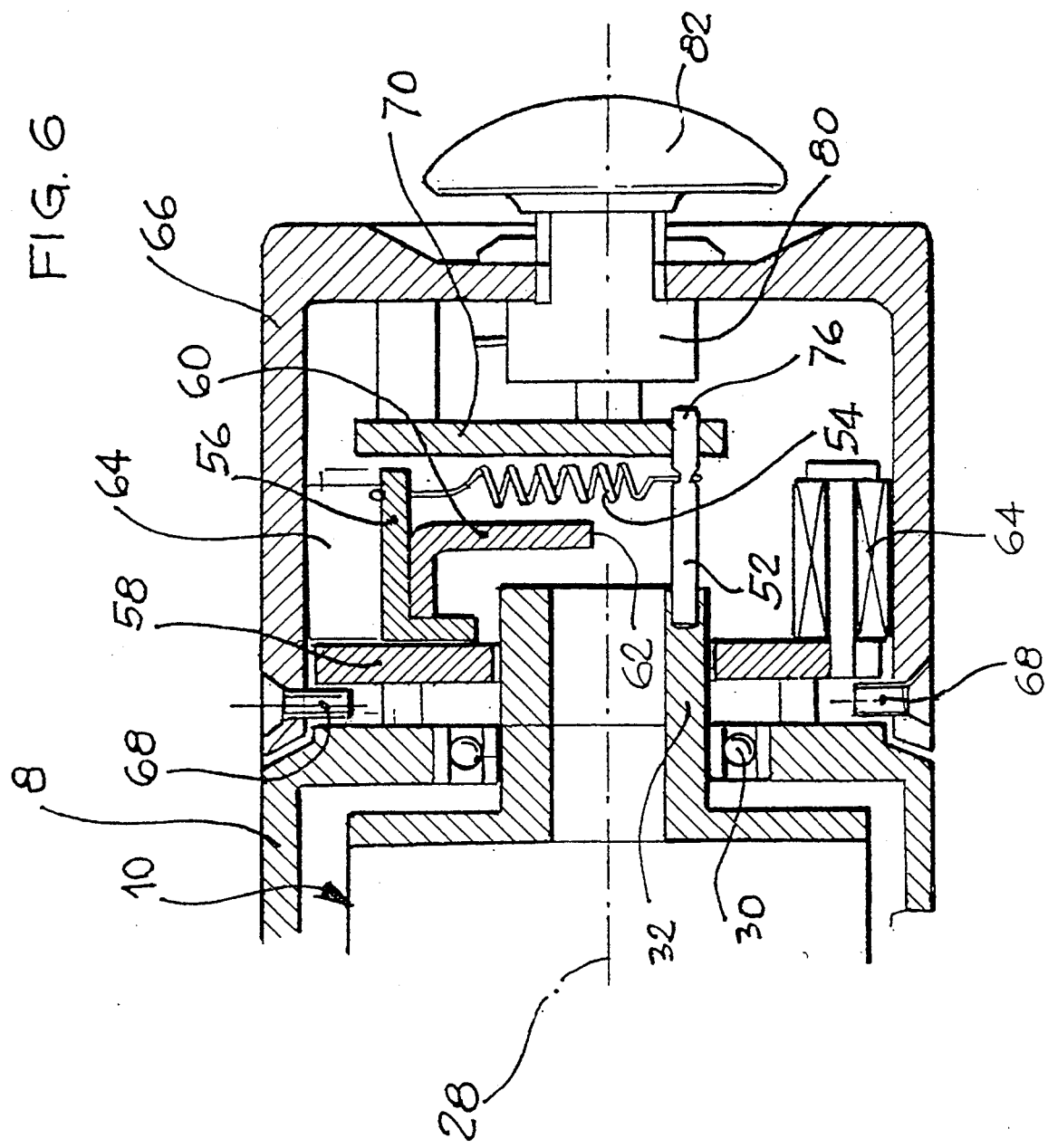

Further characteristics and advantages of the present invention will become clear in the course of the detailed description which follows, purely by way of non-limiting example, with reference to the appended drawings, in which:

FIG. 1 is a perspective view showing the keyboard according to the invention, supported by a pedestal, FIG. 2 is a perspective view of the keyboard of FIG. 1, FIG. 3 is a section taken on the line III—III of FIG. 1, FIGS. 4 and 5 are partially exploded perspective views of the portions indicated by the arrows IV and V in FIG. 2, FIG. 6 is a section taken on the line VI—VI of FIG. 2, and FIGS. 7, 8 and 9 are schematic perspective views showing the portion indicated by the arrow VII in FIG. 5, in three different positions.

With reference to FIG. 1, a keyboard, generally indicated 1, for the remote control of a machine tool, generally indicated 2, is connected to the machine tool 2 by means of a cable 4. As can be seen in greater detail in FIG. 4, the keyboard 1 comprises a tubular casing constituted by two semicircular shells 6, 8 which enclose a rotary body 10.

With reference to FIG. 3, the rotary body 10 comprises two longitudinal elements 12 with arcuate cross-sections and two flat faces 14, 16, on which two sets of keys 18, 20 are disposed. A series of boards 22—of known type—for generating coded electrical signals indicative of the commands put into effect by the operation of the keys 18, 20 is disposed within the rotary body 10 in the space defined between the faces 14, 16, and the arcuate elements 12.

As well as the two sets of keys 18, 20, the rotary body 10 carries a pair of wheel-like control members 24 (see FIGS. 3 and 4) the diameters of which are greater than the distance between the two parallel faces 14,16, so that a portion of each member projects from each of the faces 14, 16. The wheel-like control members 24 are connected to respective potentiometers which, typically, are used to bring about a percentage reduction in the speed of rotation of a mandrel and in the speed of advance of a shaft of the tool, after these parameters have been set at a predetermined value by means of the keyboard 1. The faces 14, 16 of the rotary body 10 may also have display devices or the like.

With reference to FIG. 4, the shell 8 has a display window 26 in which the faces 14, 16 are disposed in turn by virtue of the rotation of the rotary body 10 through 180° about its longitudinal axis 28. The rotary body 10 is supported for rotation in the shells 6,8 by means of a pair of bearings 30 which engage tubular extensions 32 (only one of which is visible in FIG. 4) of the body 10. The outer ring of each bearing 30 is housed between two semicircular seats 31 formed at one end of the shells 6, 8. The right-hand end of the tubular casing constituted by the shells 6, 8 in FIG. 4 carries a micrometric adjustment wheel 34 (of known type) for advancing a shaft of the tool 2 micrometrically. Still with reference to FIG. 4, two elements 36 of transparent material with C-shaped profiles are disposed at the ends of the window 26 and lamps 38 situated in correspondence therewith, illuminate the face of the rotary body 10 which is in the display window 26.

With reference to FIGS. 3 and 4, an eyelid-like closure element, indicated 40, is rotatable in the tubular casing 6, 8 in the space between the inner wall of the casing and the outer profile of the body 10. The closure element 40 is made of transparent plastics material and can adopt an open position—shown by a continuous line in FIG. 3—and a closed position shown by a chain line in the same drawing. In the closed position, the element 40 closes the display window 26 and protects the body 10 from external agents (mechanical and liquid), affording maximum security against the accidental operation of the keys 18, 20 or the members 24 when the machine is not manned, whilst enabling the functions to be seen from a distance.

A support element in which the keyboard 1 can be snap-engaged is indicated 42 in FIG. 2. The support 42 is fixed in an adjustable manner to a rod 44 which can be fixed to a pedestal, as shown in FIG. 1, or directly to the structure of the machine 2. Two strips 46 of resilient material applied to the internal surface of the support element 42 have the function of facilitating the snap-engagement of the support 42. The strips 46 also constitute an electrical insulation between the pedestal or the body of the machine tool and the casing of the keyboard. A further function of the strips 46 is to damp vibrations so that the keyboard 1 can also be fixed to parts of the machine 2 which are subject to a great deal of vibration.

With reference to FIGS. 2 and 3, the support element 42 has a pair of protective flanges 48. The flanges act as screens against the ambient and background light to improve the contrast (and hence the readability) of the illuminated face. The flanges 48 also have an anti-collision function to protect the keyboard from accidental impacts with parts of the machine or with stray objects and to prevent the risk of the keys being pressed unintentionally. For this purpose, the flanges 48 are disposed in a manner such that, the line 50 (FIG. 3) joining the ends of the flanges 48 in a cross-section in a plane perpendicular to the axis of the keyboard is situated outside the profile of the keyboard 1.

The keyboard 1 may have a resilient handle (not shown) which enables the keyboard also to be held in one hand when the keyboard is removed from the support 42. The keyboard 1 may also have a sensor which detects whether the keyboard 1 is fitted correctly in the support 42 or whether it is held in an operator's hand. This sensor may activate a signalling system or may prevent some functions of the machine if one of these conditions is not verified.

The mechanism which controls the rotation of the rotary body 10 in the casing 6, 8 will now be described with reference to FIGS. 5 to 9.

With reference first to FIGS. 5 and 6, a pin 52 is fixed to the tubular extension 32 of the body 10, parallel to and spaced from the axis of rotation 28 of the body 10. A first end of a helical tension spring 54 is fixed to the pin 52 and its second end is anchored to a flange 56 fixed to a disc 58 which is fixed to the casing 6, 8 and is slightly spaced from the end wall thereof (see FIG. 6 in particular). A stop element 60, fixed to the flange 56, has a stop surface 62 for the abutment of the pin 52.

The disc 58 carries four idle rollers 64 which support for rotation a cup-shaped element 66 connected axially to the casing 6, 8 by means of radial screws 68 (FIG. 6) inserted in the space defined between the end wall of the casing 6, 8 and the disc 58. The cup-shaped element 66 carries an entrainment member 70 constituted by a disc from which a sector extending through an angle slightly larger than 90° has been removed. The surfaces 72 and 74 of the entrainment member 70 are intended to cooperate with the end 76 of the pin 52.

An operating knob 78 fixed to the cup-shaped element 66 can be gripped by hand in order to rotate the element 66 relative the casing 6, 8. The cup-shaped element 66 also carries an emergency switch 80 with an external push-button 82 which can de-activate all the functions of the machine tool.

The operation of the mechanism which rotates the body 10 will be described below with reference to FIGS. 7, 8 and 9.

In the configuration shown in FIG. 7, the spring 54 restrains the pin 52 against the surface 62 of the stop element 60. In this configuration, the face 14 of the rotary body 10 is in the display window 26. The rotary body 10 is in a position of stable equilibrium since the biasing effect of the spring 54 prevents any undesired rotation of the body 10. In order to rotate the body 10, the knob 78 is operated in the sense indicated by the arrow 84 in FIG. 8. The surface 72 of the entrainment member 70 contacts the end 76 of the pin 52 and rotates the body 10 (see FIG. 8). During this rotation, the spring 54 extends until the body 10 has rotated through 90° about its axis 28. After this, the cup-shaped element 66 and the entrainment member 70 remain stationary and the spring 54 brings the pin 52 into abutment with the surface 62 again, causing the body 10 to perform a further 90° rotation (FIG. 9). In this second configuration, the face 16 of the body 10 is in the display window 26. Starting from the configuration of FIG. 9, the knob 78 is operated in the sense indicated by the arrow 86 in order to return the keyboard to the initial configuration shown in FIG. 7.

Clearly, the mechanism described above enables the rotary body 10 to be rotated through 180° by means of a 90° rotation of the cup-shaped element 66 which can easily be brought about solely by means of a wrist movement.

What is claimed is:

1. A keyboard assembly, particularly but not exclusively for the remote control of machine tools, said assembly comprising a tubular casing with a display window therein, a body with at least two faces, said body being rotatable within said casing such that said faces are positionable in said display window as a result of the rotation of said body, at least two sets of keys and/or controls disposed on said at least two faces, respectively, and at least one board connected to said keys and/or controls, said at least one board being able to generate coded electrical signals indicative of commands put into effect by the operation of the keys and/or controls.

2. A keyboard assembly according to claim 1, further comprising resilient means for biassing said rotary body towards at least two stable equilibrium positions in each of which one of said at least two faces is in said display window.

3. A keyboard assembly according to claim 2, wherein said rotary body has an axial appendage which is fixed to said rotary body, parallel to and spaced from the axis of rotation of said body, said casing has a stop surface for abutment by said appendage at two points situated on opposite sides of the axis of rotation of said body, and said tubular casing comprises an anchoring element which is fixed thereto, said resilient means comprising a tension spring having a first end anchored to said axial appendage and a second end anchored to said anchoring element, said spring being able to restrain said appendage resiliently against said stop surface in the two positions in which said rotary body is in stable equilibrium.

4. A keyboard assembly according to claim 3, furthermore comprising a hand-operable rotary entrainment member which cooperates with said axial appendage and which can move said appendage from a first of its points of contact with said stop surface, causing said tension spring to extend, to a point in which said appendage is biased by said spring towards its second point of contact with said stop surface.

5. A keyboard assembly according to claim 1, wherein said rotary body comprising at least one wheel-like control member having a hand-operable portion which projects from each of said at least two faces.

6. A keyboard assembly according to claim 1, further comprising an eyelid-like protective screen which is rotatable in said tubular casing coaxially with said rotary body and can close said display window.

7. A keyboard assembly according to claim 1, wherein said tubular casing is formed by two shells which have semicircular cross-sections and the ends of which define two seats for respective bearings for supporting said rotary body.

8. A keyboard assembly according to claim 1, further comprising a support element with a substantially C-shaped cross-section in which said tubular casing can be snap-engaged.

9. A keyboard assembly according to claim 8, wherein said support element has a pair of protective flanges arranged in a manner such that a line joining the ends of said flanges in a cross-section in a plane perpendicular to the axis of the tubular casing lies outside the profile of said tubular casing.

10. A keyboard assembly according to claim 8, wherein at least one strip of soft material with good vibration-damping capability is interposed between said support element and said tubular casing.

11. A keyboard assembly according to claim 1, wherein means are disposed within said casing for illuminating the face of the said rotary body which is situated in said display window.

* * * * *